United States Patent [19]

Chavannes

[11] 4,228,209

[45] * Oct. 14, 1980

[54] WIRE REINFORCED CORRUGATED BOARD AND METHOD AND APPARATUS FOR MAKING SAME

[76] Inventor: Marc A. Chavannes, 4044 Roberts Point Ave., Sarasota, Fla. 33581

[*] Notice: The portion of the term of this patent subsequent to May 20, 1997, has been disclaimed.

[21] Appl. No.: 913,242

[22] Filed: Jun. 6, 1978

Related U.S. Application Data

[63] Continuation of Ser. No. 771,993, Feb. 25, 1977, abandoned, which is a continuation of Ser. No. 551,978, Feb. 21, 1975, abandoned.

[51] Int. Cl.² .................... B32B 29/02; B31F 1/24
[52] U.S. Cl. .................... 428/108; 156/179; 156/206; 156/210; 156/436; 156/470; 428/110; 428/112; 428/182; 428/184; 428/186; 428/293
[58] Field of Search .............. 156/179, 176, 178, 298, 156/300, 309, 324, 252, 253, 210, 205, 311, 265, 266, 436, 439; 428/182, 184, 186, 114

[56] References Cited

U.S. PATENT DOCUMENTS

| | | | |
|---|---|---|---|
| 864,775 | 9/1907 | Ferres | 428/182 |
| 952,074 | 3/1910 | Ferres | 428/182 |
| 958,450 | 5/1910 | Wardell | 428/182 |
| 1,269,140 | 6/1918 | Wheildon | 156/178 |
| 3,591,434 | 7/1971 | Hartstein | 156/178 |
| 3,687,764 | 8/1972 | Rogosch et al. | 156/322 |
| 3,802,974 | 4/1974 | Emmel | 156/179 |
| 4,008,352 | 2/1977 | Dawes et al. | 156/311 |

FOREIGN PATENT DOCUMENTS 187005  4/1905  Fed. Rep. of Germany .......... 428/184

OTHER PUBLICATIONS

Kellicutt, "How Liner/Medium Weight Relationships Affect the Strength of Corrugated," Boxboard Containers, May 1972, pp. 51–56.

*Primary Examiner*—Michael W. Ball
*Attorney, Agent, or Firm*—Eugene E. Geoffrey, Jr.

[57] ABSTRACT

A reinforced laminate and the method and apparatus for the manufacture thereof which includes the embedding of reinforcing wire elements in plastic layers and plastic laminates to provide reinforced structures, producing a reinforced corrugated laminate including a corrugated layer with plastic layers applied to one or both sides thereof, producing a wire grid, corrugating the grid and applying overlying plastic layers and combining the planar and corrugated structures with cushioning and resilient foam materials.

23 Claims, 49 Drawing Figures

WIRE REINFORCED CORRUGATED BOARD AND METHOD AND APPARATUS FOR MAKING SAME

This application is a continuation of application Ser. No. 771,993, filed Feb. 25, 1977, now abandoned, which is a continuation of application Ser. No. 551,978, filed Feb. 21, 1975, now abandoned, and is related to applications Ser. Nos. 599,142, filed July 25, 1975 and 733,436, filed Oct. 18, 1976.

This invention relates to reinforced plastic sheet material in both substantially planar and corrugated form and to novel and improved methods and apparatus for manufacturing such materials. The invention further relates to the lamination of the aforesaid reinforced plastic sheets with other resilient and cushioning materials which are particularly suited among other applications for packaging articles for shipment.

This invention has as one of its objects the provision of a novel and improved corrugated material formed of plastic sheets and relatively stiff wire reinforcing elements which is not only moistureproof but also may be made impervious to gases and which will neither deteriorate nor weaken even when constantly subjected to moisture. Depending upon the application, the reinforcing elements may either be coated with a plastic or uncoated and are preferably in the form of longitudinal and transverse elements secured in spaced relationship to form a structure affording substantial strength in the finished material. Moreover, reinforcing elements of a variety of diameters and plastic layers of various thicknesses may also be utilized depending upon the strength and stiffness desired.

Another aspect of the invention involves an improved plastic sheet material having longitudinal and transverse wires embedded therein to provide materially added strength and at the same time protect the wires from corrosion or deterioration from water and gases. The sheet material may be either a single layer or laminate or be in the form of a corrugated structure with plastic layers on one or both sides thereof.

Another object of the invention resides in the provision of novel and improved methods and apparatus for fabricating reinforced sheet and corrugated plastic materials having reinforcing elements of wire embedded therein.

Still another object of the invention resides in the provision of a novel and improved method and apparatus for forming a grid of longitudinal and transverse reinforcing elements and embedding them in a plastic sheet.

A still further object of the invention resides in the provision of a novel and improved method and apparatus for forming a grid of longitudinal and transverse wires, corrugating said grid and applying overlying layers of plastic to form a relatively rigid board of appreciable thickness with substantially complete resistance to moisture.

A still further object of the invention resides in the provision of a novel and improved method and apparatus for forming a corrugated board of plastic material having a corrugated grid of longitudinal and transverse wires with overlying layers of plastic sheets having wire grids embedded therein.

A further object of the invention resides in the provision of an improved material comprising a wire reinforced plastic sheet structure laminated with resilient and cushioning materials.

This invention concerns the formation of improved plastic materials wherein a reinforcing grid in either flat or corrugated form is combined with plastic sheet material to form a reinforced plastic sheet or structure of appreciable thickness wherein the grid is corrugated and lies between two sheets of plastic. The corrugated grid may be coated with a plastic or may be uncoated and the overlying plastic sheets may also be reinforced with grids. The improved plastic materials may also be laminated with resilient and cushioning sheet materials for packaging and other purposes. Formation of the plastic materials involves both an improved method and apparatus whereby the sets of longitudinal and transverse elements of wire arranged in perpendicular grid-like relationship are embedded individually or simultaneously in plastic to form a reinforced sheet. The sets of elements whether embedded or unembedded may then be corrugated and enclosed by overlying plastic sheets sealed to the corrugated structure. If desired, the overlying sheets may also be reinforced by wire. Resilient or cushioning material may also be sealed to either the reinforced plastic sheet or the corrugated structure.

The above and other objects of the invention will become more apparent from the following description and accompanying drawings forming part of this application.

In the drawings:

FIGS. 1B' and 1C' correspond to FIGS. 1B and 1C respectively and show more precisely the relative thickness of the plastic layers and reinforcing wire elements.

FIG. 6B is a cross-sectional view of FIG. 6A taken along the line 6B—6B of FIG. 6A;

FIG. 13 is a modified embodiment of the invention for producing a laminated corrugated reinforced plastic material in accordance with the invention;

FIGS. 13A, B and C are cross-sectional views of successive stages in the formation of the product produced by the apparatus shown in FIG. 13;

FIG. 13D is a cross-sectional view of the completed material formed by the apparatus of FIG. 13;

FIG. 13E is a modified form of material produced by the apparatus of FIG. 13;

FIG. 13E' is similar to FIG. 13E showing the thicknesses of the plastic layers and reinforcing elements more precisely.

FIGS. 14 and 15 show combinations of reinforced plastic materials with cellular material and foam respectively; and FIGS. 16 and 17 show combinations of reinforced corrugated materials with cellular material and foam respectively.

As pointed out above, the improved product comprises a plastic sheet or laminate having reinforcing wires disposed therein or in the alternative may comprise a coated or uncoated corrugated wire grid having layers of plastic on one or both sides thereof. One method and apparatus for forming reinforced plastic sheet material in accordance with the invention is shown in FIGS. 1 and 1A through C. While the resultant product produced by the apparatus of FIG. 1 as well as the products produced by the apparatus shown in FIGS. 2, 4, 5 and 6 are useful for many purposes, it will be shown that such products are also useful in the formation of other types of reinforced products in accordance with the invention for structural, packaging and other similar applications.

Figures 1, 1B, 1C:
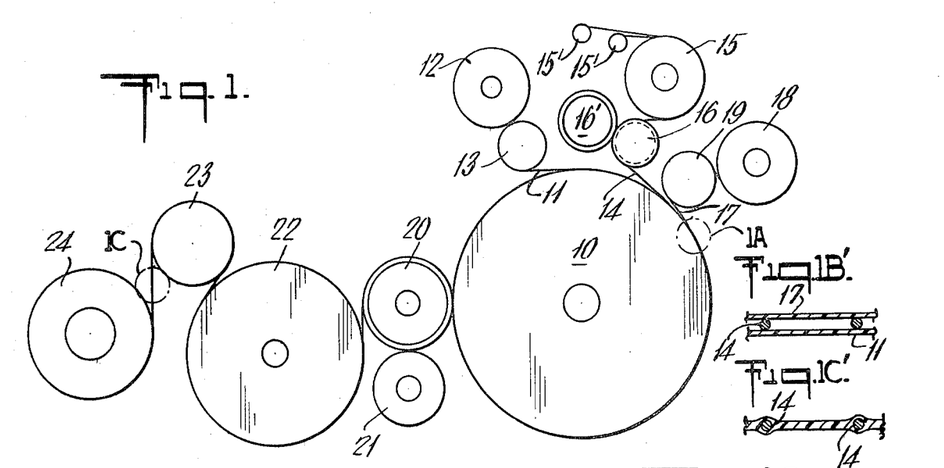
FIG. 1 is a diagrammatic view of the apparatus for forming a plastic laminate having longitudinal wires disposed therein.
FIG. 1B is a cross-sectional view of FIG. 1A taken along the line 1B—1B thereof.
FIG. 1C is a cross-sectional view of the completed laminate.

Reference is now made to FIG. 1 which illustrates one embodiment of the invention for fabricating a plastic laminate having longitudinal reinforcing wires embedded therein. More specifically the apparatus includes a relatively large heated drum 10 onto which the first film 11 which may be precoated with a heat sensitive adhesive, is fed from the roll 12 and about roller 13. If desired, the roller 13 may also be heated in order to increase the temperature of the film 11 just prior to its engagement with the drum 10. Immediately following the application of the film 11 to the drum 10, a plurality of wires 14 are fed from a plurality of spools 15' about rollers 15 and 16 and onto the drum 10 and in overlying relationship with film 11. The roller 16 is preferably provided with a plurality of spaced, annular, wire receiving grooves to maintain the desired wire spacing. The roller 15 which initially spaces the wires will be described in detail in connection with FIG. 3.

A second film 17, which may be pre-coated with a heat sensitive adhesive is fed from a roll 18 and about the roller 19 in overlying relationship with the wires 14. The laminate then proceeds about the drum 10 and sufficient heat is applied to the laminate so that the two films can be sealed one to the other with the wires therebetween. The temperature of the drum 10 is, of course, related to the speed so that adequate heat is transferred to the plastic films. For instance, if the drum 10 is rotating at a relatively high speed the temperature of the drum can be at or even above the melting point of the plastic film 11. On the other hand, should the drum be operated at a low speed it would be necessary to maintain the temperature of the drum slightly below the melting point of the film 11.

Figure 1A:
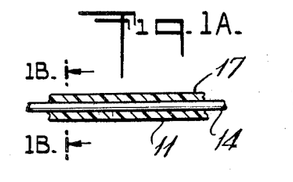
FIG. 1A is an enlarged cross-sectional view of the laminate with the reinforcing wires disposed therebetween at an initial stage in the formation of the product.
Figure 1B:
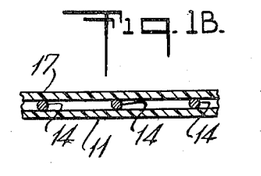
Figure 1C:
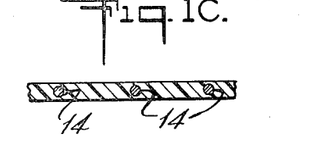

The two films are sealed one to the other by a pressure roller 20 preferably covered with a thin layer of polytetrafluorethylene in order to prevent any possible adherence of the film to the pressure roller. The coating of the roller 20 is denoted by the numeral 20' and the roller 20 is preferably cooled by engagement with a cooling roller 21 since it is important that the surface of the roller be maintained at a temperature well below the melting point of the plastic and preferably below the embossing temperature. The roller 20 also functions to remove the completed laminate from the roller 10 whereupon it is fed about cooling rollers 22 and 23 and then wound upon a spool 24. FIG. 1A shows a longitudinal section through the laminate prior to the sealing of the films 11 and 17 one to the other. FIG. 1B shows a transverse view of the laminate prior to sealing of the layers, while FIG. 1C is a transverse view showing the two layers sealed one to the other with the wires 14 disposed therein. In actual practice each of the films is normally about one half the thickness of the wires and a more accurate representation of the product is shown in section in FIGS. 1B' and 1C.

It is evident from the description of the apparatus in FIG. 1 that if it is desired to use a single film such as the film 11 and merely embed the wires 14 in the surface thereof the wires may be coated with a primer such as sodium silicate, for instance, or may be coated with a very thin layer of a suitable plastic in order to facilitate adherence of the wire to the film 11. In such a case the wires whether including a primer and the coating of plastic or just the plastic coating itself would be fed onto the surface of the film 11 as shown in FIG. 1 and thereafter the pressure roller 20 would force the wires into the surface of the film.

In feeding the wires 14 into overlying relationship with the film 11 it may be desirable or necessary to maintain a predetermined tension on the wires. For this purpose an auxiliary roller 16' may be utilized which bears against the grooved roller 16 and by the utilization of braking means on the roller 16' the tension on the wires can be controlled accurately.

Figure 2:
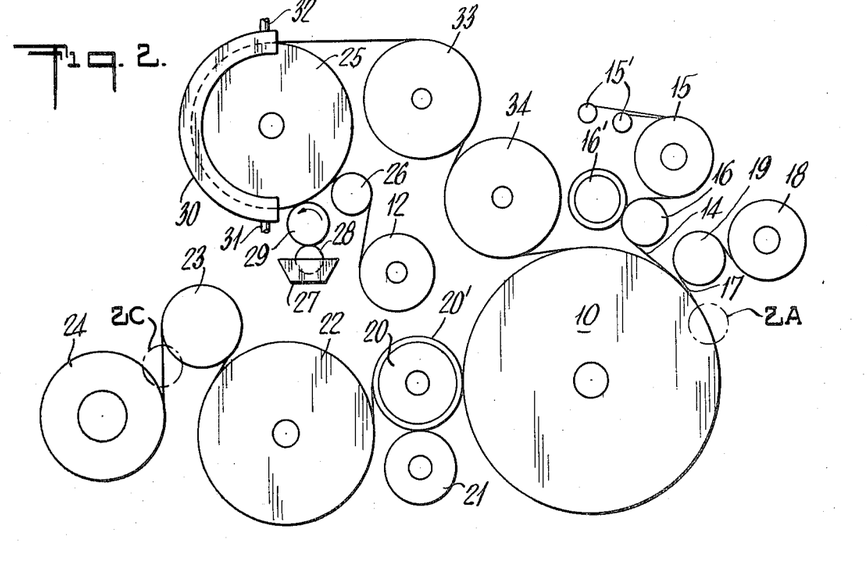
FIG. 2 illustrates a modified embodiment of the invention wherein the reinforced laminate is formed by the utilization of an adhesive.
Figure 2A:
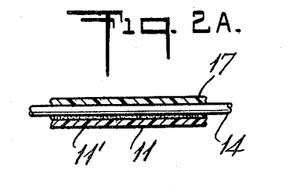
FIG. 2A is an enlarged cross-sectional view of the laminate at an initial stage in the formation thereof.
Figure 2B:
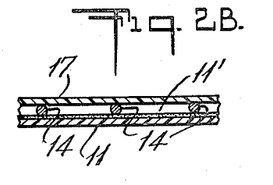
FIG. 2B is a cross-sectional view of FIG. 2A taken along the line 2B—2B of FIG. 2A.
Figure 2C:
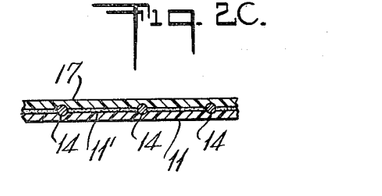

A modified form of the invention shown in FIG. 1 is illustrated in FIG. 2. In these figures like components are denoted by like numerals. In the form of the invention shown in FIG. 2 the film 11 is fed from a spool 12 and thence onto a roller or drum 25 by means of an intervening idler roller 26. An adhesive contained in a trough 27 is applied to the outer surface of the film 11 by means of applicator rollers 28 and 29 whereupon the coated film passes through drying means 30 which may be in the form of an electric heater or in the alternative may be in the form of a housing having an inlet 31 and an outlet 32 for feeding hot air through the housing and over the surface of the film. The dried film is then fed about the rollers 33 and 34 to the drum 10. The remainder of the process is identical to that of FIG. 1 except that the temperature of the roller 10 can be modified so that it will adequately heat the heat sensitive adhesive in order to provide a seal between the films 11 and 17. If desired, the film 17 may be coated in a manner similar to the film 11 so that the meeting surfaces of both films are coated with heat sensitive material in order to facilitate formation of a seal therebetween. FIG. 2A shows the initial relationship of the wires 14, the adhesive coated layer 11 and the non-coated layer 17. FIG. 2B is a cross-sectional view of 2A while FIG. 2C shows the complete structure with the adhesive 11' between the two layers.

It is evident that a wide variety of plastic materials may be used to form the sheets 11 and 17 and the selection of the specific plastic would then, in a large part, depend on the ultimate use for the product. For instance, it may be desirable to use films having different characteristics as well as different colors for decorative purposes and the films may either be thermoplastic or thermosetting. When substantial strength is desired particularly when the product is to be used in high temperature or structural applications a thermosetting plastic is desired. Such a thermosetting plastic should, of course, have a thermoplastic stage and then ultimately assume a thermosetting stage in the final product. It is also evident that the plastic layers may have substantial flexibility for certain applications while in other applications relatively rigid plastics may be utilized.

In providing a product for specific application to the packaging industry, plastics such as polyethylene, polystyrene, high density polyethylene, polypropylene, as well as the polyamides and the polyesters are probably the more desirable plastics that can be used.

Figure 3:
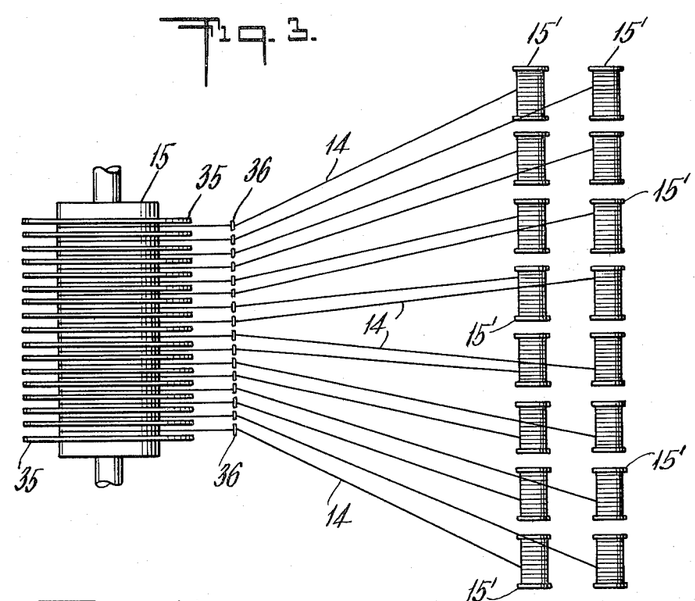
FIG. 3 is a plan view of one form of apparatus for feeding wires into the laminates of FIGS. 1 and 2.

While the wires 14 may be guided onto the drum 10 in any suitable manner, one form of apparatus which may be used for this purpose is illustrated in FIG. 3. In this figure the roller 15 which guides the wires onto the roller 16 is provided with a plurality of closely spaced discs 35 which maintain the spacing between the wires 14. The wires are fed from a plurality of spools 15' through a series of guides 36 which lead the wires between the discs on the roller 15. With this arrangement the roller 16' would be provided with a resilient surface and bear against the wires 14 while on the roll 16. With such an arrangement tension would effectively be controlled and it would not be necessary to rely solely on the friction of the wires with the roller 16 in order to control the tension.

Figure 4:
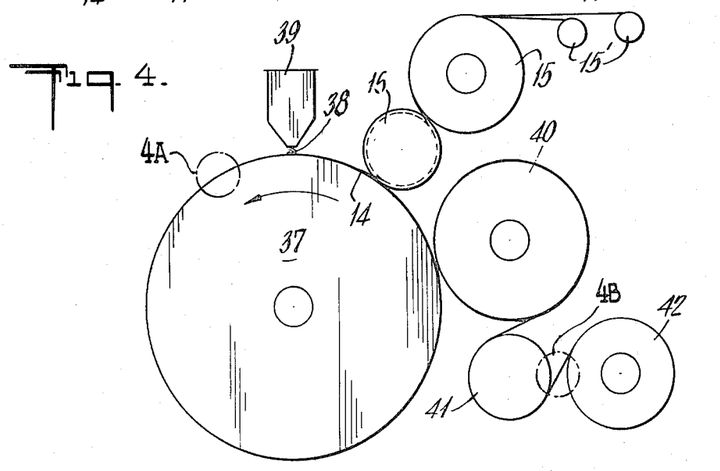
FIG. 4 illustrates apparatus for producing a reinforced plastic sheet in accordance with the invention.
Figure 4A:
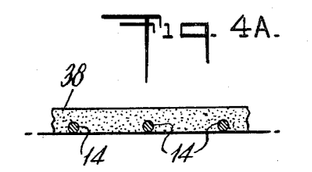
FIG. 4A and 4B are cross-sectional views of two stages in the formation of the reinforced plastic sheet produced by the apparatus of FIG. 4.
Figure 4B:
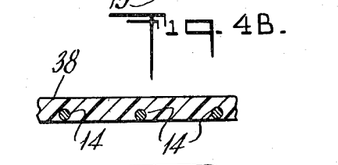

FIG. 4 illustrates a further modification of the invention wherein a plastic material is extruded directly onto a drum and in contact with a plurality of longitudinally disposed reinforcing elements such as wires. In this embodiment of the invention, drum 37 is preferably cooled by the circulation of water or other suitable coolant therethrough and a plurality of wires 14 are fed from a plurality of spools 15' via the roller 16 to the surface of the drum 37. The drum 37 may or may not have a plurality of fine grooves for the receipt of the wires 14. In most cases however it would not be necessary to groove the drum provided adequate tension is maintained on the wires. Immediately after feeding the wires onto the drum 37 a plastic material 38 is extruded onto the drum by an extruder 39 which may preferably be a straight-die extruder. Since the plastic extruded onto the surface of the drum is at a very high temperature it will surround the wires as illustrated in FIG. 4A and then will gradually cool until it reaches the take-off roller 40. The roller 40 is cooled in order to reduce the temperature on the sheet so that it can be fed about the roller 41 and then wound on spool 42. The complete product is shown in FIG. 4B and is then ready for either further processing or direct use for the desired purpose. The form of the invention shown in FIG. 4B is substantially identical to the product previously described in connection with FIG. 1 wherein a single film 11 is utilized and the wires 14 are embedded in the surface of the film. It is also understood in connection with FIG. 4 that the wires 14 may be either coated or uncoated as desired.

Figure 5:
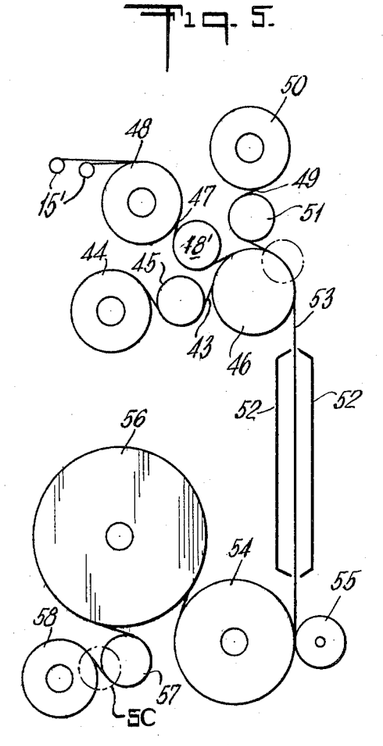
FIG. 5 illustrates still another embodiment of the invention for forming a wire reinforced laminate.
Figure 5A:
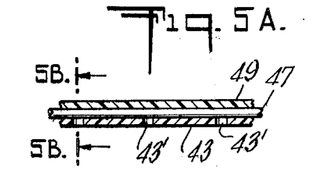
FIG. 5A is a cross-sectional view of an initial stage in the formation of the laminate by the apparatus shown in FIG. 5.
Figure 5B:
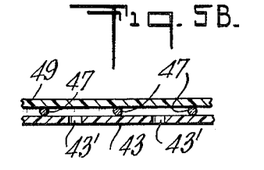
FIG. 5B is a cross-sectional view of FIG. 5A taken along the line 5B—5B thereof.

A further embodiment of the invention is illustrated in FIG. 5. In this embodiment of the invention a film 43, which may be pre-perforated, is fed from a spool 44 about a roller 45 onto a drum 46. Immediately following the application of the film 43 a plurality of wires 47 are fed from spools 15', about rollers 48 and 48' and onto the surface of the perforated film 43. The rollers 48 and 48' correspond essentially to the rollers 15 and 16 of FIG. 1. A second unperforated film 49 is fed from a spool 50 about a roller 51 and into overlying relationship with the longitudinally disposed wires 43. The structure of the product at this point in the process is shown in FIG. 5A which illustrates the relationship of the films 43 and 49 with the wires 47 disposed therebetween. The perforations in film 43 are denoted by the numeral 43'. FIG. 5B is a cross-sectional view of FIG. 5A.

The laminate denoted by the numeral 53 then moves downwardly between heaters 52 and about a roller 54 which has vacuum ports distributed throughout the surface thereof and is also cooled by the circulation of the coolant therethrough. The specific structure of the roller 54 is well-known in the art.

Heat imparted to the laminate 53 by the heaters 52 is sufficient to enable production of an adequate seal between the films 43 and 49 with the wires disposed therebetween. If desired, a pressure roller 55 may be coordinated with the roller 54 to insure an adequate seal. The films 43 and 49 with the wires 47 disposed therebetween are then further cooled by roller 56 whereupon they are fed about a roller 57 and wound upon the spool 58. The resultant product is shown in cross-section in FIG. 5C, though in actual practice the thickness of the combined plastic layers may not exceed the thickness of the wires.

Figure 5C:
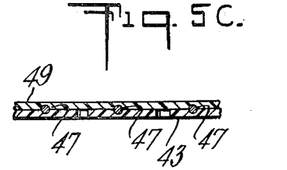
FIG. 5C is a cross-sectional view of the complete laminate formed by the apparatus of FIG. 5.
Figure 6:
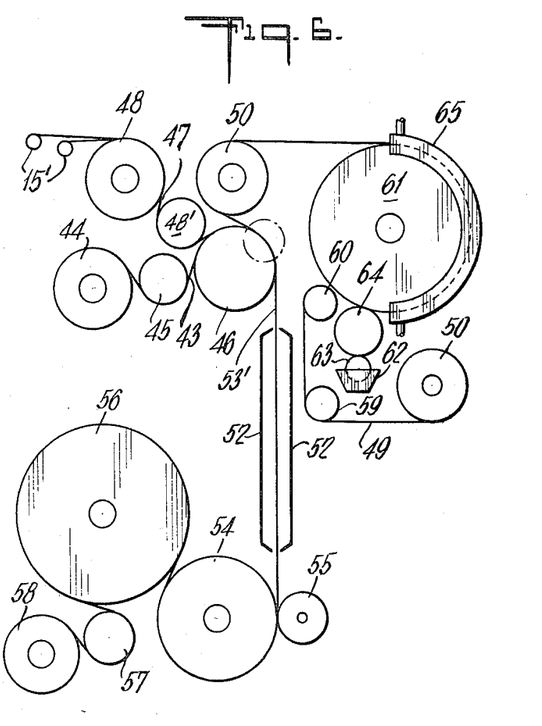
FIG. 6 is a modified form of the apparatus shown in FIG. 5 utilizing an adhesive for forming the wire reinforced laminate.
Figure 6A:
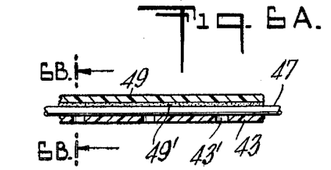
FIG. 6A is a cross-sectional view of an initial state in the formation of the laminate with the apparatus of FIG. 6.
Figure 6C:
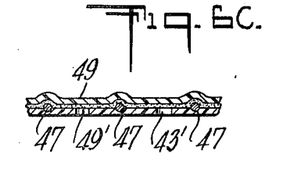

The form of the invention shown in FIG. 6 is substantially identical to that form illustrated in FIG. 5 except that one of the plastic sheets is coated with a heat sensitive adhesive prior to lamination with the other layer. Accordingly, in these two figures, like numerals are utilized to denote like components. In this embodiment of the invention film 43 is first fed onto the roller 46 in the manner described in connection with FIG. 5 whereupon the longitudinal wires are fed into overlying relationship with the film. The film 49 is fed from a spool 50 about rollers 59 and 60 and thence onto the drum 61. An adhesive contained in the trough 62 is applied to the surface of the film 49 by rollers 63 and 64 whereupon the film then travels about the roller 61 and is dried by a radiant heater 65 and/or hot air as desired. The coated film then leaves the roller 61 and is fed about the roller 50 and onto the roller 46 in overlying relationship with the wires to produce an initial laminate denoted by the numeral 53 and illustrated in section in FIGS. 6A and 6B. The preliminary laminate passes between heaters 52—52 and thence about the cooled vacuum roller 54 which by reason of the perforation of the film 43 produces adherence of the two films one to the other. Inasmuch as the heat sensitive adhesive is utilized the temperature of the films, in order to effect sealing, would not need to be as high as in the case of the apparatus shown in FIG. 5 with the result that one of the films, namely, film 49 would be slightly deformed to lie closely about the wires 47 as shown in FIG. 5C. In this figure the adhesive is denoted by the numeral 49'. If desired, in order to provide a more effective seal, a pressure roller 55 may be utilized in combination with the roller 54 in which event the resultant product would take more nearly the form shown in FIG. 5C of the drawings. In FIGS. 6A to C the thickness of the films have been enlarged for illustrative purposes.

In the previous embodiments of the invention a laminate was formed utilizing a plurality of longitudinal wires with a layer of plastic on either one or both sides of the wires as the case may be. It is evident however that if desired in the previous embodiments of the invention one of the films may be previously formed with wires extending transversely thereof so that the resultant product would have both transverse and longitudinal wires disposed therein and thus form in effect a grid enclosed in a plastic. It is also evident that various sizes of wire and various thicknesses and types of plastic materials may be employed depending on the use of the resultant product.

Figures 7, 7A, 7B, 7C:
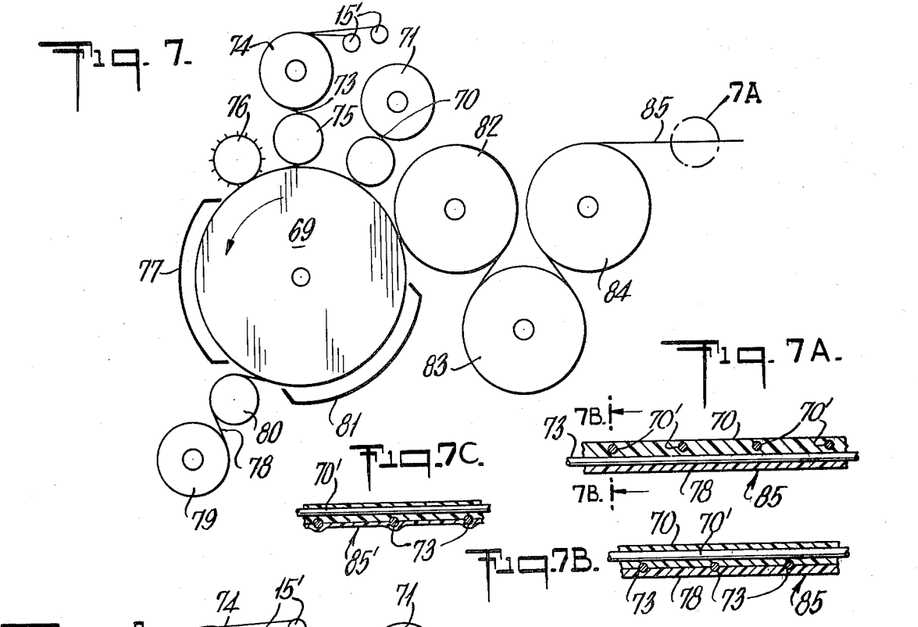
FIG. 7 illustrates an embodiment of the invention for forming a laminate having both longitudinal and transverse reinforcing wires.
FIG. 7A is a cross-sectional view of the reinforced laminate formed with the apparatus of FIG. 7.
FIG. 7B is a cross-sectional view of FIG. 7A taken along the line 7B—7B thereof.
FIG. 7C is a view similar to FIG. 7B showing more precisely the relative thicknesses of the plastic layers and reinforcing wires.
Figures 8, 8A, 8B:
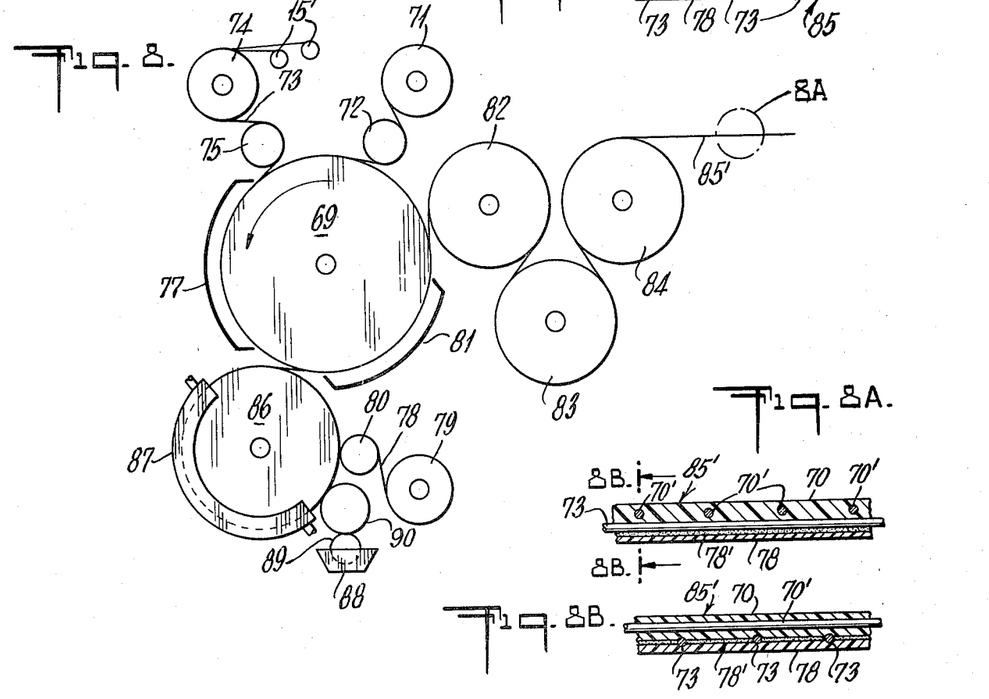
FIG. 8 illustrates apparatus for forming a plastic laminate having both longitudinal and transverse reinforing wires wherein the laminate utilizes an adhesive for joining the layers.
FIG. 8A is a cross-sectional view of the complete laminate formed by the apparatus of FIG. 8.
FIG. 8B is a cross-sectional view of FIG. 8A taken along the line 8A—8A thereof.

FIGS. 7 and 8 illustrate two forms of the invention for producing resultant products having both longitudinal and transverse wires embedded in plastic sheets. While any number of procedures may be utilized in forming a plastic sheet with transverse wires therein one suitable procedure involves the utilization of a product such as shown in FIG. 1C, 1C', 2C, 4B, 5C or 6C and cutting them to lengths equivalent to the width of the sheet. Each severed portion is rotated 90° and then successive such portions secured together by heat sealing or other suitable means to provide an elongated roll of film wherein wires extend transversely of the film. Such a structure may be utilized in connection with FIG. 7.

The apparatus of FIG. 7 includes a drum 69 having vacuum ports distributed over the surface thereof and means for the circulation of a suitable fluid therethrough for controlling the temperature of the drum. This is desirable inasmuch as heating means are provided about the drum as will be described in order to raise the temperature of the films for the purpose of lamination. A first film denoted by the numeral 70 is fed from a spool 71, about a roller 72 and onto the drum 69. Thereafter a plurality of longitudinal wires 73 are fed from a plurality of spools 15' about rollers 74 and 75 into overlying relationship with the film 70. The rollers 74 and 75 correspond essentially to rollers 15 and 16 of FIG. 1. A perforating drum 76 having a plurality of tines extending therefrom perforate the film 70 so that the vacuum produced within the drum 29 will cause the film to adhere closely to the surface of the drum. The film 70 together with the wires 73 then passes beneath the heater 77 which raises the temperature of the film and the wires to a point close to the melting point of the film. A second film 78 is fed from a spool 79 and about the roller 80 into overlying relationship with the wires 73 and thence past the heater 81 that imparts heat to the outer film and raises it to a temperature required for sealing it to the first film 70.

One or the other of the films 71 and 78 contains transverse wires and the film may be produced in a manner previously described. The heated structure then passes between the nip of drum 69 and roller 82 in order to effect the seal between the two films and the sealed films then pass about the roller 82 and then about rollers 83 and 84. Rollers 82 through 84 also function to cool the laminate so that the resultant laminate 85 is ready to be rolled upon a spool or carried to subsequent processing apparatus. The resultant laminate 85 is shown in FIGS. 7A and 7B. In this case the film 70 has a plurality of wires 70' and the wires 73 are disposed between the film 70 and the film 78. A cross-sectional view of the structure shown in FIG. 7A is illustrated in FIG. 7B. FIG. 7C is similar to FIG. 7B and shows more precisely the relative thicknesses of the plastic layers and wires.

The structure shown in FIG. 8 differs from the structure shown in FIG. 7 in that an adhesive is utilized in order to secure the two plastic sheets one to the other. In this form of the invention a drum 69 substantially identical to the drum described in connection with FIG. 7 is utilized and the first film 70 is fed from a spool 71 and about the roller 72 onto the drum 69. A plurality of wires 73 are then fed from a plurality of spools 15' and about the rollers 74 and 75 into overlying relationship with the film 70. The wire 73 and film 70 are then fed beneath the heater 77 to bring the film and the wires up to a sealing temperature. The film 78 is fed from a spool 79 about a roller 80 and onto a drum 86 having heating means 87 disposed about a portion of the periphery thereof. An adhesive contained in the trough 88 is fed by means of rollers 89 and 90 to the outer surface of the film 78 and the coated film is then dried by the heater 87 and is fed onto the drum 69 in overlying relationship with the wires 73. Further heat is imparted to the laminate on the drum 69 by the heater 81 to complete the seal between the two films with wires 73 disposed therebetween. As in the case of FIG. 7 one or the other or the films 70 and 78 preferably includes transverse wires so that the resultant structure has both longitudinal and transverse wires forming in effect a grid embedded in the plastic laminate. The complete laminate then passes about rollers 82, 83 and 84 which are preferably cooled so that the resultant laminate 85' is ready for further processing or storage as the case may be. If desired the roller 82 may be in pressure engagement with the laminate as it passes between that roller and drum 69 in both FIGS. 7 and 8 to insure uniform sealing of the layers. The resultant structure 85' is shown in FIG. 8A and includes the film 70 having wires 70' disposed therein, a layer of adhesive 78' and a bottom layer of plastic 78. The wires 73 are, of course, disposed between the layers. FIG. 8B is a cross-sectional view of FIG. 8A.

Figures 9, 9A, 9B, 9C:
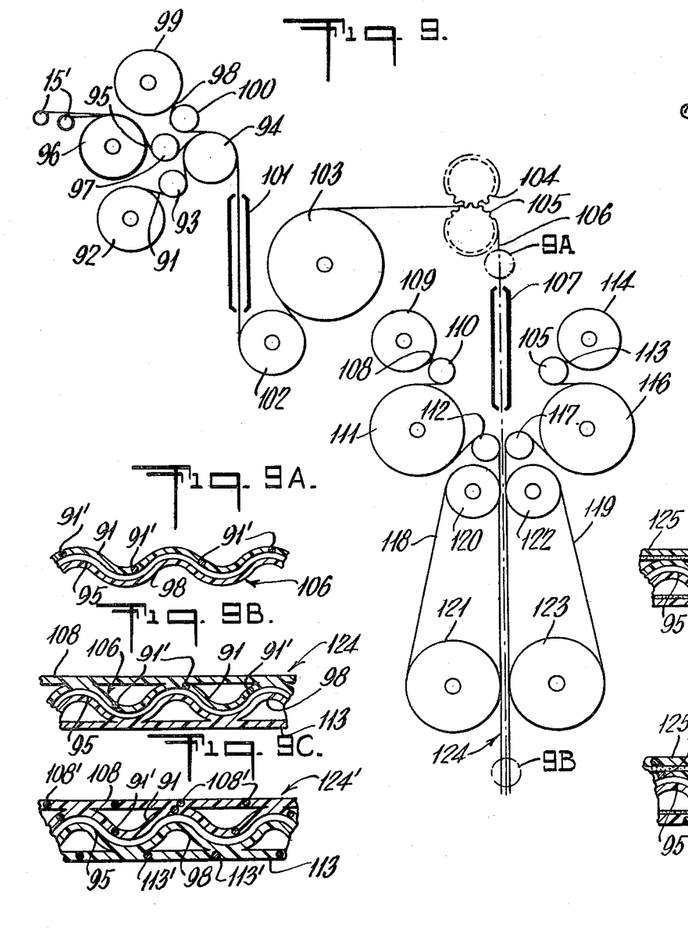
FIG. 9 illustrates apparatus for foming a corrugated laminate material having reinforcing wires embedded therein.
FIG. 9A is a cross-sectional view of an initial step in the formation of the laminate corrugated material produced by the apparatus of FIG. 9.
FIG. 9B is a cross-sectional view of one form of the completed laminate corrugated material produced by the apparatus of FIG. 9.
FIG. 9C is a cross-sectional view of a modified form of material shown in FIG. 9B.

FIG. 9 illustrates an embodiment of the invention for producing a reinforced corrugated laminate that may be used for the formation of cartons and the like in the packaging of articles as well as for structural elements. The resultant structure essentially comprises a corrugated portion having overlying layers on one or both sides thereof. The corrugated portion is preferably reinforced with transverse wires though longitudinal wires may also be used and the overlying layers may be similarly reinforced by longitudinal or transverse wires or both as the case may be.

In this embodiment of the invention the first plastic sheet 91 preferably pre-coated with an adhesive is fed from a spool 92 about a roller 93 and onto a drum 94. The drum 94 may be temperature controlled to impart heat to the film 91 to raise its temperature to the vicinity of the melting point. The film 91 may, of course, include transverse wires as previously described in connection with the embodiment of the invention shown in FIGS. 7 and 8 or it may be an unreinforced film. Thereafter a plurality of longitudinal wires 95 are fed from a plurality of spools 15' and about rollers 96 and 97 (rollers 15 and 16 of FIG. 3) onto the drum 94 in overlying relationship with the film 91 in much the same manner as described in connection with FIG. 3. A second film 98 is fed from a spool 99, about the roller 100 and onto the drum 94 in overlying relationship with the wires 95. The film 98 may or may not be provided with longitudinal reinforcing wires as described in connection with the film 91.

The laminate is then fed downwardly through a heater 101 and about the rollers 102 and 103 to the corrugating rollers 104 and 105. If the film 91 is perforated in the same manner as described in the embodiment of the apparatus shown in FIGS. 7 and 8 or if the film is pre-perforated, the roller 102 would then be provided with a multiplicity of vacuum ports in the surface thereof with appropriate vacuum means connected to the ports in a manner well-known in the art, and sealing would then be effected on the vacuum roller. On the other hand if the film 91 is not perforated, rollers 102 and 103 could be positioned in close proximity one to the other to provide sufficient pressure to effect a satisfactory seal. In either case, however, the roller 103 is preferably cooled to lower the temperature of the complete laminate prior to engaging the corrugating rollers 104 and 105.

The resultant laminate denoted by the numeral 106, then passes downwardly through a heater 107 to again raise at least the surface layers of the corrugate to a sealing temperature. A third film 108 preferably pre-coated with an adhesive which may or may not contain reinforcing wires is fed from a spool 109 and about rollers 110 and 111, the latter being heated in order to bring the adhesive on the surface of the film 108 to a sealing temperature. The heated film 108 is then fed about a roller 112, which may also be heated and then into surface contact with the corrugated structure 106. A fourth and preferably pre-coated film 113 similar to the film 108, is fed from a spool 114 and about the rollers 115, 116 and 117 into overlying relationship with the other side of the corrugated structure 106. The roller 116 is heated in the same manner as described in connection with the roller 111 and if desired the roller 117 may also be heated in order to maintain the temperature of the film 113 at the sealing temperature as in the case of the film 108.

The corrugated structure 106 together with the overlying layers 108 and 113 is fed between a pair of cooling belts 118 and 119 with the belt 118 being carried by cooled rollers 120 and 121 and the belt 119 being carried by cooled rollers 122 and 123. Belts 118 and 119 are in sufficiently close proximity one to the other to apply pressure to the laminate to insure sealing of the overlying layers to the corrugated structure 106 without substantially deforming it. The resultant structure is denoted by the numeral 124 and is ready for further processing or use.

A cross-sectional view of the corrugated structure 106 is illustrated in FIG. 9A, the plastic layers having been enlarged in thickness for illustrative purpose. It will be observed that the film 91 includes transverse wires 91', longitudinal wires 95 and the plastic layer 98. The final structure 124 as shown in FIG. 9B includes the corrugated substructure 106 having longitudinal and transverse wires and a pair of overlying layers of plastic 108 and 113. A modified form of the invention is shown in cross-section in FIG. 9C and denoted by the numeral 124'. In this form of the invention the structure 106 has overlying layers 108 and 113 as in the case of FIG. 9B, but also includes transverse reinforcing wires 108' and 113'. It is, of course, evident that the overlying layers 108 and 113 may also include both longitudinal and transverse reinforcing wires, as shown for instance in FIG. 13E which will be described.

Figures 10, 10A, 10B:
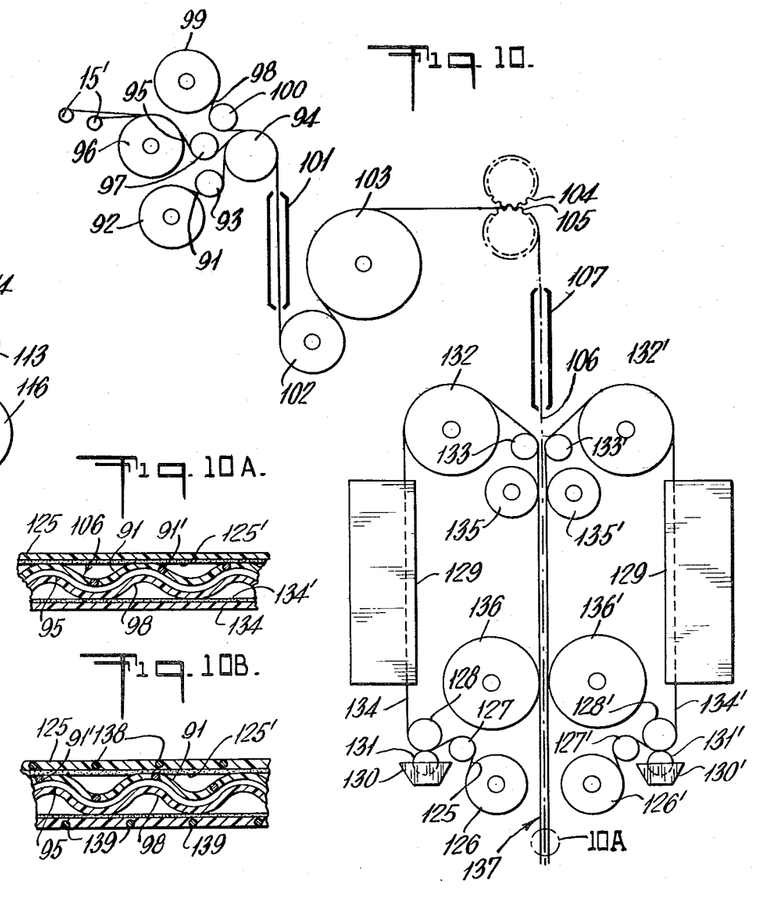
FIG. 10 is a modified form of the apparatus shown in FIG. 9 wherein the outer layers of material are joined to the corrugated material by means of an adhesive.
FIG. 10A is a cross-sectional view of the material produced by the apparatus of FIG. 10.
FIG. 10B is a cross-sectional view of a modified form of material produced by the apparatus of FIG. 10.
Figures 13, 13A, 13B, 13C, 13D, 13E, 14, 15, 16, 17:
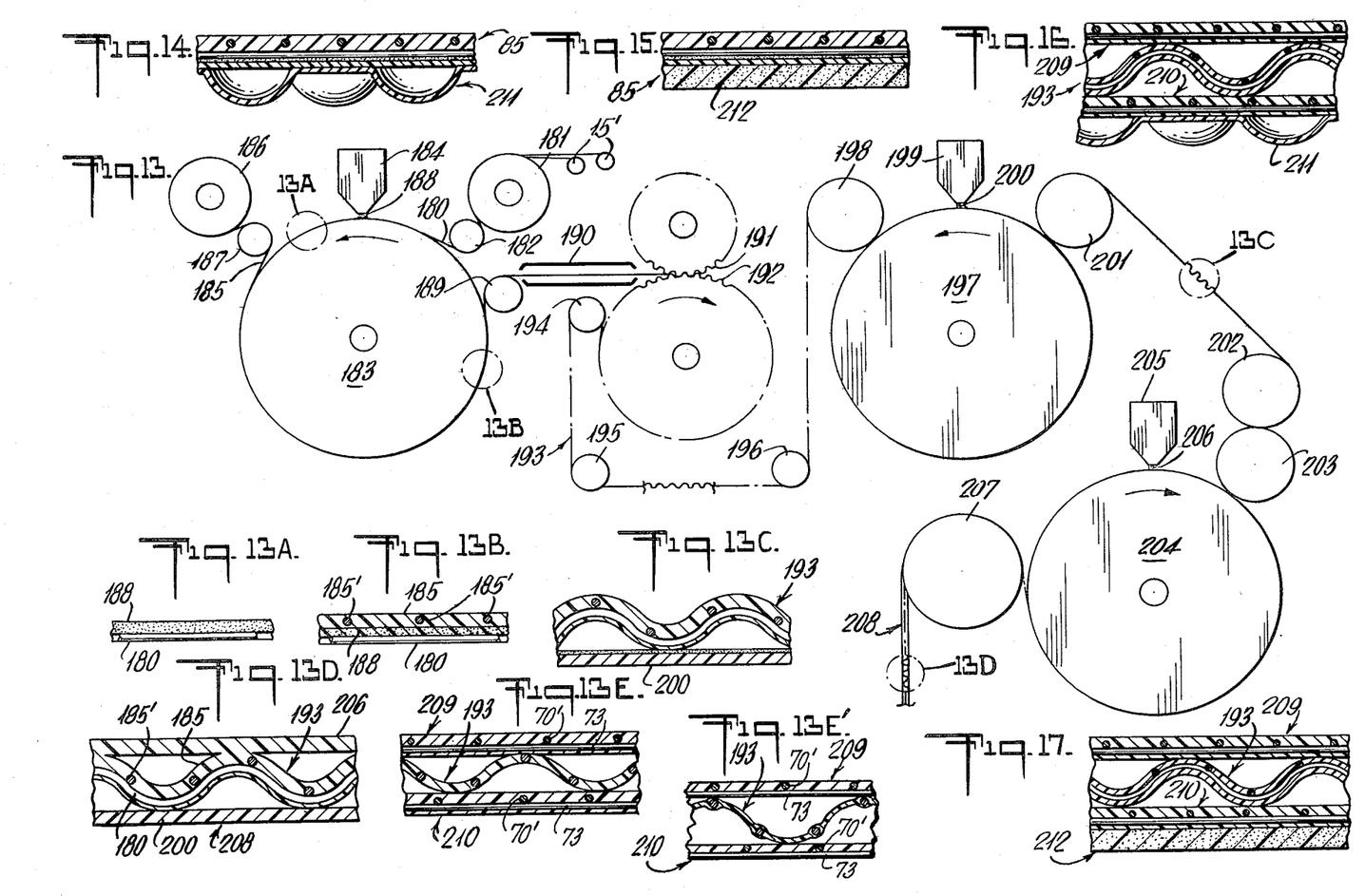

The form of the invention shown in FIG. 10 is similar to that illustrated in FIG. 9 and like numerals are utilized to denote like components. The formation of the corrugated laminated reinforced structure 106 is substantially identical to that illustrated and described in connection with FIG. 9. The overlying layers however are coated with an adhesive just prior to the application to the corrugated structure. More specifically the film 125 is fed from the spool 126 about rollers 127 and 128 thence upwardly through an oven 129. A trough 130 carries an adhesive which is applied to the film 125 by a roller 131. The adhesive is dried in the oven 129 and then fed about the rollers 132 and 133 into contact with one side of the corrugated structure 106. The apparatus for applying the second film 134 to the other side of the corrugated structure 106 is identical to that described above and like primed numerals are utilized to denote like components. The corrugated structure 106 together with the two films 125 and 134 are fed downwardly between cooling rolls 135, 135' and 136, 136' to cool the structure and insure good adhesion of the outer layers. The resultant structure is denoted by the numeral 137 and is illustrated in cross-section in FIG. 10A. In this figure the corrugated structure 106 is identical to the illustrated in FIG. 9A and it includes the outer layers 125 and 134 secured to the corrugated structure by adhesive layers 125' and 134'. The outer layers 125 and 124 may include reinforcing wires as illustrated in 10B wherein the reinforcing wires are denoted by the numeral 138 in the layer 125 and the numeral 139 in the layer 134. Longitudinal reinforcing wires are also preferably included in the outer layers as shown in FIG. 13E to be described.

The preceding embodiments of the invention such as the embodiments shown in FIGS. 1 and 4 through 10 may be made utilizing a wire grid in place of the longitudinal wires in which event the provision of a plastic layer having transverse wires embedded therein would not be necessary. Thus, in FIG. 9 for example, the films 91 and 98 would not need transverse wires since a wire grid could be fed between the films in place of merely the longitudinal wires 95. An improved method and apparatus for producing such a grid is illustrated in FIG. 11.

Figures 11, 11A:
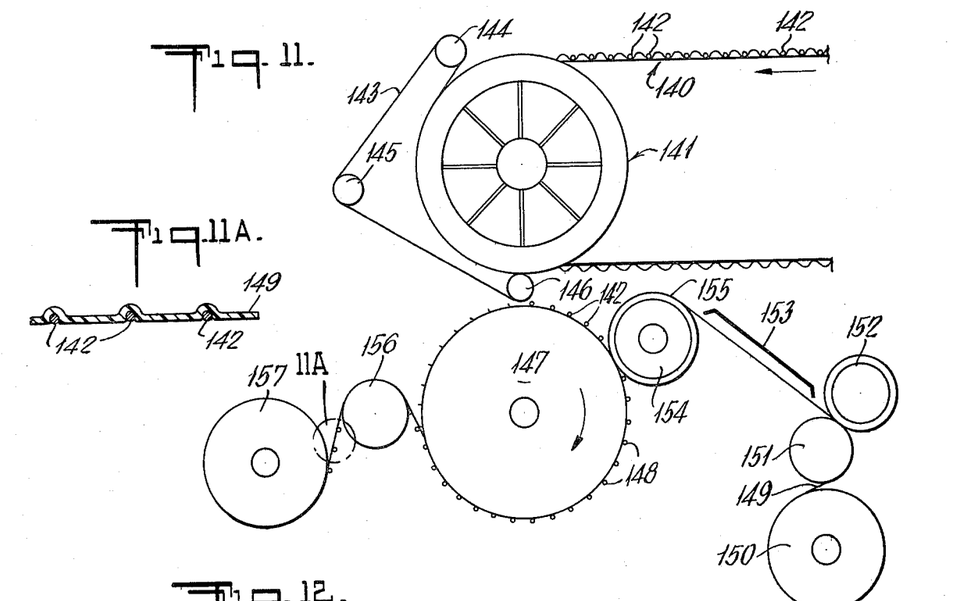
FIG. 11 illustrates one procedure in accordance with the invention for forming a wire grid for use in making corrugated reinforced plastic material.
FIG. 11A is a cross-sectional view of the wire grid produced in accordance with the apparatus of FIG. 11.

In FIG. 11 a transversely corrugated belt generally denoted by the numeral 140 is carried by a pair of drums of which only one is illustrated and denoted by the numerals 141. Suitable means are provided for cutting wires into predetermined lengths and feeding them individually into the troughs of the belt 140. The wires denoted by the numerlas 142 are illustrated on the top side of the belt and move in direction toward the drum 141. A plurality of narrow belts 143 carried by sets of rollers 144, 145 and 146 hold the wires 142 in position on the corrugated belt 140 as it travels downwardly about the left side of the drum 141 is shown in FIG. 11. As each wire reaches the bottom-most portion it is discharged onto a drum having a plurality of axially aligned hooks 148 disposed about the periphery thereof. As each of the wires 142 is discharged onto the drum 147 it is engaged by one set of hooks and is therefore retained in position as the drum 147 rotates. A set of longitudinally disposed wires, denoted by the numeral 149, are fed from a plurality of spools 15' in much the same manner described in connection with FIG. 3. These wires are fed about the rollers 150 and 151, corresponding to the rollers 15 and 16 of FIG. 3, and pass between the nip of that roller and a second roller 152. The roller 152 is preferably grooved to insure the maintenance of proper spacing between each of the plurality of wires 149. Wires 149 then pass beneath the heating means 153 and about the roller 154 which has a resilient layer 155 on the surface thereof and preferably includes a plurality of grooves formed therein in order to clear the axial arrays of hooks 148 carried by the roller 147. The wires 149 ride about the surface of the outer layer 155 on the roller 154 and are urged into tight engagement with each of the transverse wires 142 to form a grid. In the preferred embodiment however the wires 149 are coated with a heat sensitive adhesive or plastic which will insure a firm union between the two sets of wires. The joined wires, which now form a grid, are carried about the roller 147 and are guided by the roller 156 onto the spool 156. It is preferable, of course, that the drum 147 be cooled in order to rapidly lower the temperature of wires after they have been joined. A cross-sectional view of the resultant grid is illustrated in FIG. 11A wherein the longitudinal wires 149 are shown gripping the transverse wires 142. If both sets of the wires have been pre-coated with a plastic or suitable adhesive of the heat sensitive type it will facilitate formation of a structure wherein the wire grid is corrugated and then overlying layers are applied as will now be described in connection with FIG. 12.

Figures 12, 12A:
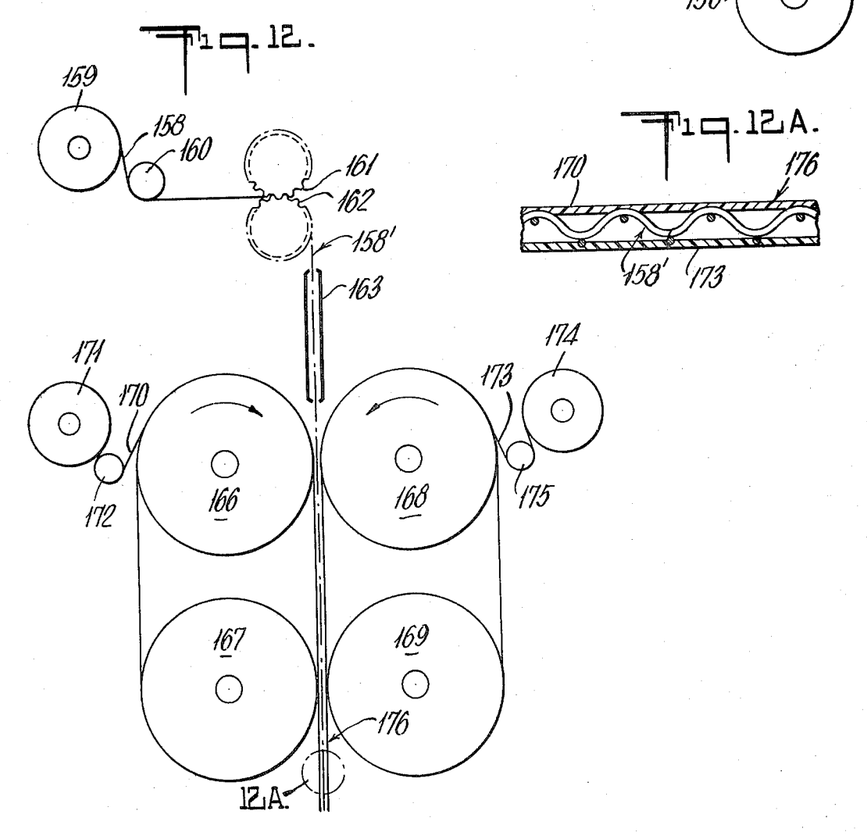
FIG. 12 illustrates apparatus for forming a corrugated laminated material utilizing a wire grid, as for instance the grid shown in FIG. 11A.
FIG. 12A is a cross-sectional view of the product produced by the apparatus of FIG. 12.

In FIG. 12 a wire grid, denoted by the numeral 158, is fed from a spool 159 and about a roller 160 to corrugated rollers 161 and 162. The corrugated grid, now denoted by the numeral 158', is fed through a heater 163 and thence downwardly between a pair of belts 164 and 165. The belt 164 is carried by a pair of rollers 166 and 167 while the belt 165 is carried by a pair of rollers 168 and 169. The rollers 166 through 169 are preferably cooled in order to maintain the belts at a temperature well below the melting point or embossing temperature of the films to be applied to the surface of the corrugated structure. A first film of plastic 170 is fed from a spool 171 about roller 172 and onto the outside of the belt 164 as it passes about the roller 166. A second film 173 is fed from a spool 174 about the roller 175 and onto the belt 165 as it passes about the top side of roller 168. Since the wires have been heated to a relatively high temperature in the heater 163 they will impart sufficient heat to the films as they are pressed into engagement with the wires by the rollers 166 and 168. At the same time the rollers acting through the belts 164 and 165 maintain the films 170 and 173 in firm engagement with the corrugated grid while the entire structure is cooled. The resultant structure denoted by the numeral 176 is shown in FIG. 12A. The corrugated grid is denoted by the numeral 158' and it will be observed that the outer portions thereof are embedded in the outer layers of plastic 170 and 173. In most cases when utilizing a wire grid, it is preferable to use coated wires in order to protect the metal from corrosion.

A still further modification of the invention is illustrated in FIG. 13 and illustrates one method and apparatus for continuously producing a corrugated structure wherein a reinforced corrugated layer is first produced and then the overlying layers are successively applied. In this figure a plurality of longitudinal wires 180 are fed from a plurality of spools 15' and about rollers 181 and 182 (which correspond to rollers 15 and 16 of FIG. 3) onto a cooling drum 183 which may be cooled by the circulation of water or other liquid coolant in the manner well-known in the art. Immediately after the application of the wires a plastic layer is applied to drum 183 by an extruder 184. Thereafter a plastic sheet or film 185 is fed from a spool 186 and about a roller 187 into overlying relationship with the extruded layer 188. Inasmuch as the layer 188 is at a relatively high temperature it will encase the wires 180 and since it is at least at the normal sealing temperature it will adhere to the film 185 which is applied immediately after extrusion. The layer 185 preferably comprises a film previously processed to combine it with transversely positioned wires in the manner previously described. FIG. 13A shows a cross-sectional view of the wires 180 immediately after the layer 188 is extruded onto the drum 183 in overlying relationship with the wires. FIG. 13B is a cross-sectional view of the structure after the film 185 is applied to the extruded layer 188. In this figure it will be observed that the layer 185 includes transverse wires 185'. The structure is shown in FIG. 13B which is formed on the drum 183 is then removed by a roller 189 whereupon it passes through heating means 190 and thence to a pair of corrugating rollers 191 and 192. The corrugated structure denoted by the numeral 193 passes about rollers 194, 195 and 196 and is then fed onto a second cooling drum 197 by means of the roller 198. Preceding the application of the structure 193 to the drum 197, a second extruder 199 feeds a plastic layer 200 onto the drum 197. While the drum 197 is cooled in the same manner as drum 183, nevertheless the plastic layer 200 is at a relatively high temperature and therefore upon the application of the corrugated structure 193 it will firmly adhere to the layer 200. The resultant structure is shown in cross-section of FIG. 13C and is removed from the drum 197 by a roller 201 and is then fed about rollers 202 and 203 onto the drum 204. Prior to the application of the corrugated structure, with a layer of plastic applied to one side thereof, to the drum 204 a third extruder 205 applies a plastic layer 206 to the drum. This plastic layer forms a second overlying layer for the corrugated structure. Since the extruded layer 206 is at a high temperature when the corrugated structure is applied it will firmly adhere to the structure whereupon the layer 206 is cooled by the drum 204 in the same manner as the layers 188 and 200 were cooled by the drums 183 and 197. The resultant structure is then removed by roller 207 and the final material is denoted by the numeral 208.

A cross-sectional view of the resultant structure 208 is shown in FIG. 13D which shows the relative positions of the several layers including the reinforcing wires in the corrugated structure. From the foregoing description it is quite evident that reinforced layers such as shown in FIGS. 7B and 7C, and 8B may be utilized as the outer layers in the formation of the corrugated structure by apparatus shown in FIG. 13 in place of the extruders 199 and 205. In such a case the reinforced layers would be preheated before being fed to the drums 197 and 204 in order to provide adequate heat to effect a seal with the corrugated structure 193. The utilization of outer layers 209 and 210 such as shown in FIGS. 7B and 7C and 8B would produce a resultant structure as illustrated in FIG. 13E. However, in the latter case it is generally not necessary to use longitudinal wires in the corrugated structure as the outer layers provide adequate structural strength. For purposes of illustration, the plastic layers and wires have been exaggerated in thickness in FIGS. 13A to 13E. FIG. 13E' illustrates the product of FIG. 13E with the relative thicknesses of the plastic layers and wires more precisely displayed.

It is evident that the various products thus far discussed and manufactured in accordance with the invention may be utilized either alone or in combination with the other types of packaging materials in order to meet a wide variety of needs in the packaging industry. For instance, the structure denoted by numeral 85 in FIG. 7C may be combined, as illustrated in FIG. 14, with a cellular material generally denoted by the number 211 to provide a substantially rigid wall covered on at least one side by the cushioning material. The cushioning material may take any suitable form and may be a material such as illustrated and described in U.S. Pat. No. 3,142,599. FIG. 15 illustrates a further modification of the invention wherein the layer 85 is combined with a plastic foam 212 formed of polyurethane or other suitable material. It is evident that while the reinforced plastic layers 85 have been illustrated in FIGS. 14 and 15 similar combinations may be made with the reinforced layers shown in other of the figures previously described. FIGS. 16 and 17 show still additional products which may be manufactured in accordance with the invention. In FIG. 16 the structure as shown in FIG. 13E is combined with the cellular material 211 while in FIG. 17 the same structure is combined with a plastic foam 212. It is, of course, evident that the structure of FIG. 13D may be utilized in place of the structure of FIG. 13E and even a structure such as shown in FIG. 13C may be utilized either in the manner illustrated or may be reinforced with longitudinal or transverse wires.

In all of the embodiments of the invention illustrated and described it is evident that various types of materials may be utilized in their fabrication. For instance, the reinforcing elements may be formed of steel having the desired carbon content and various steel alloys as well as aluminum, copper and other similar metals may be utilized which afford structural strength and rigidity. Lightweight metals such as magnesium or even tungsten may be used where weight is a significant factor. In connection with the plastic material polyethylene of various densities, polypropylenes and their copolymers, polystyrenes and polyvinyl chloride may be employed, various polyesters and polyamides can also be used. Thermosetting resins may also be employed for various applications such as modified and flexible phenolic resins, also phenolformaldehydes, urea-formaldehydes, furfural-formaldehydes as well as melamine-formaldehydes. In order to provide resistance to moisture vapor and other gases the plastic films utilized may be precoated with a film of polyvinylidene chloride or other similar relatively gas impervious plastics. As previously mentioned the various products produced in accordance with the invention have been illustrated in most cases with the thicknesses of the plastic and adhesive layers being exaggerated in thickness for clarity. However, in each instance the plastic layers are usually about one-half the thickness of the reinforcing wires. It is also understood that the number of wires per inch, the thickness of the wires and the thickness and type of the plastic layers can all be modified to achieve the desired structural strength. Similarly, the arrangement of the reinforcing wires can also be selected to achieve the desired ends. For instance, when using both longitudinal and transverse wires in the layers overlying the corrugated structure it may not be necessary to use the longitudinal wires in the central corrugated structure. The term "wires" as used in this application is intended to include wires of various cross sectional configurations such as round, oval, flat, square and the like.

While only certain embodiments of the invention have been illustrated and described, it is understood that modifications, alterations and changes may be made without departing from the scope and spirit of the invention as defined in the appended claims.

What is claimed is:

1. A wire reinforced plastic structure comprising a wire reinforced corrugated plastic layer with said corrugations corrugating both said plastic layer and said wires and extending transversely of said wires, and at least one sheet of plastic bonded to the crest portions on one side of said corrugated layer.

2. A wire reinforced plastic structure according to claim 1 wherein a second outer layer of plastic is adhered to the other side of said corrugated structure.

3. A wire reinforced plastic structure according to claim 2 wherein said first layer of plastic includes a second set of wires disposed transversely of said first reinforcing wires.

4. A wire reinforced plastic structure according to claim 1 wherein said outer layer comprises a wire reinforced plastic laminate.

5. A wire reinforced plastic structure according to claim 1 wherein said reinforced corrugated plastic layer includes a second plastic layer adhered thereto in overlying relationship with said wires disposed therebetween.

6. A wire reinforced plastic structure according to claim 5 wherein said outer layer comprises a wire reinforced plastic laminate.

7. A wire reinforced plastic structure according to claim 5 wherein a second outer layer of plastic is adhered to the other side of said corrugated structure.

8. A wire reinforced plastic structure according to claim 7 including a second set of wires disposed transversely of said first set of wires, said sets of wires being disposed between the first said plastic layer and said second overlying plastic layer.

9. A wire reinforced plastic structure according to claim 7 wherein both of said outer layers are wire reinforced.

10. A wire reinforced plastic structure according to claim 1 including a layer of cellular cushioning material bonded to at least one side thereof.

11. The method of manufacturing reinforced corrugated plastic board comprising the steps of adhering a plurality of spaced parallel wires to a plastic web, corrugating said web transversely of said wires, and then adhering a second plastic web to the crest portions of at least one side of said corrugated web.

12. The method of manufacturing wire reinforced corrugated plastic board according to claim 11 including the step of adhering a third plastic web in overlying relationship with said wires prior to said corrugation.

13. The method according to claim 12 wherein one of said webs includes transversely disposed wires secured in spaced parallel relationship thereto.

14. The method according to claim 12 including the steps of feeding said third web onto a drum, adhering a second plurality of parallel wires to the last said web while on said drum, severing said web into lengths to form segmental portions, placing said portions in side by side relationship to form a continuous succession of said portions with the wires extending transversely thereof, adhering said succession of portions in overlying relationship with the first said web having the wires adhered thereto, whereupon the completed laminate is then corrugated transversely thereof and said second web applied thereto.

15. The method according to claim 14 including the further step of adhering a second overlying web to the crest portions of said other side of said laminate.

16. The method according to claim 15 wherein at least one of said overlying webs comprises a wire reinforced plastic web.

17. The method of forming a wire reinforced laminate comprising the steps of feeding a web about a first drum, feeding a second web about a second drum in close proximity to the first said drum, feeding a plurality of spaced wires between said webs as they pass between said drums, adhering said webs firmly one to the other with the wires disposed therebetween to complete the laminate, transversely corrugating the completed laminate, and adhering an overlying web to the crest portions of at least one side of said corrugated laminate.

18. The method according to claim 17 including the step of heating said webs to a sealing temperature during movement about said drums and urging said drums one toward the other to seal said webs with the wires disposed therebetween.

19. The method of forming a reinforced plastic laminate comprising the steps of feeding a layer of plastic having a thermoplastic stage onto a drum feeding a plurality of spaced parallel reinforcing wire elements into overlying relationship with said plastic layer, feeding a second layer of plastic into overlying relationship with said wires, then with layers at a sealing temperature applying pressure to said heated layers to seal them one to the other, corrugating said resultant laminate transversely of said wires and then sealing an overlying plastic layer to the crest portions on at least one side of said corrugated laminate.

20. Apparatus for manufacturing reinforced corrugated plastic board comprising a heated drum, means for feeding a plastic web about said drum, means for adhering a plurality of wires in spaced parallel relationship to and lengthwise of said web while on said drum, a pair of cooperating corrugating rollers, means for feeding said plastic and wire structure through said corrugating rollers and means for adhering a second of plastic web to the crest portions on a least one side of said corrugated plastic and wire structure.

21. Apparatus according to claim 20 including a second drum adjacent to the first said drum, means for feeding a third plastic web about said second drum and means urging said second drum against the first said drum to effect adherance of said third web to the first web and in overlying relationship to said wires to enclose the wires between said first and third webs.

22. Apparatus according to claim 21 including means for adhering a fourth plastic web to the crest portions of the other side of said corrugated plastic and wire laminate.

23. Apparatus for manufacturing a reinforced plastic material comprising a drum, means for feeding a first layer of plastic onto said drum, means for feeding a plurality of reinforcing wires into overlying relationship with said first layer, means for feeding a second layer of plastic into overlying relationship with said wires, pressure applying means subjecting said layers, while at a sealing temperature, to a pressure to embed the wires in said layers and seal the layers one to the other to form a resultant laminate, means for corrugating said resultant laminated structure transversely of said wires, means for reheating said structure and means for sealing at least one overlying layer to the crest portions of said corrugated structure.

* * * * *